US012807347B2

(12) United States Patent
Savino et al.

(10) Patent No.: US 12,807,347 B2
(45) Date of Patent: Nov. 24, 2026

(54) SEAL BAR

(71) Applicant: Plant Tap, LLC, North Salem, NY (US)

(72) Inventors: Joseph Camillo Savino, North Salem, NY (US); Canio Carlucci, Redding, CT (US); Bill Hotchkiss, Hyde Park, NY (US); William D. Suh, Cary, NC (US)

(73) Assignee: Plant Tap, LLC, North Salem, NY (US)

( * ) Notice: Subject to any disclaimer, the term of this patent is extended or adjusted under 35 U.S.C. 154(b) by 0 days.

(21) Appl. No.: 18/673,974

(22) Filed: May 24, 2024

(65) Prior Publication Data

US 2024/0391619 A1 Nov. 28, 2024

Related U.S. Application Data

(60) Provisional application No. 63/504,511, filed on May 26, 2023.

(51) Int. Cl.

| | |
|---|---|
| ***B29C 65/22*** | (2006.01) |
| ***B65B 7/16*** | (2006.01) |
| *B29L 31/00* | (2006.01) |

(52) U.S. Cl.

CPC ............ *B65B 7/164* (2013.01); *B29C 65/226* (2013.01); *B29L 2031/7128* (2013.01)

(58) Field of Classification Search

CPC ....... B65B 7/164; B29C 65/18; B29C 65/226; B29C 66/21; B29C 66/43121; B29C 66/73921

USPC ........................................................ 156/583.1

See application file for complete search history.

(56) References Cited

U.S. PATENT DOCUMENTS 6,656,310 B2 * 12/2003 Basque ............... B29C 65/7433 156/515

2023/0134697 A1 * 5/2023 Perell ..................... B65D 75/42 222/1

FOREIGN PATENT DOCUMENTS

WO WO-8802339 A1 * 4/1988 ............. B29C 66/80

* cited by examiner

*Primary Examiner* — James D Sells

(74) *Attorney, Agent, or Firm* — FINNEGAN, HENDERSON, FARABOW, GARRETT & DUNNER L.L.P

(57) ABSTRACT

A seal bar for sealing a pouch is provided, wherein the seal bar may comprise a face, wherein the face may be configured to apply heat to seal the pouch, a cavity, wherein the cavity may be configured to form a nozzle shape in the pouch, a seal dot, wherein the seal dot may be configured to apply heat to the pouch, and a heating element, wherein the heating element may be configured to heat the face.

20 Claims, 11 Drawing Sheets

SEAL BAR

CROSS REFERENCE TO RELATED APPLICATIONS

This application claims benefit of priority of U.S. Provisional Patent Application No. 63/504,511, filed May 26, 2023, the contents of which are incorporated herein by reference in their entirety.

TECHNICAL FIELD

The present disclosure relates to systems, methods, and apparatuses for seal bars having a cavity and seal dot.

BACKGROUND

Flexible pouches may contain a variety of liquid materials, such as a plant-based paste, lotion, cream, shampoo, hair product, sauce, ketchup, food puree, juice, smoothie, or any other liquid materials. Flexible pouches may reduce the overall weight of packaging, which may allow more liquid materials to be filled within the flexible pouches. Flexible pouches may also take up less space than rigid packaging, which can reduce shipping costs and increase durability of the packaging during transportation and storage. Additionally, flexible packaging may reduce environmental impacts by increasing material and energy savings throughout the manufacturing process.

In some instances, flexible pouches may be used to contain a plant-based paste for forming a plant-based food or beverage product. Such flexible pouches may be placed in a chamber of a machine, and the chamber may be configured to apply pressure to the flexible pouch to squeeze the plant-based paste or other liquid materials out of the pouch and into a bottle. The plant-based paste or other liquid materials may be mixed with water in the bottle to form a plant-based food or beverage product.

Challenges arise in preventing the liquid materials from evacuating from the flexible pouch before pressure is applied to the flexible pouch. If the flexible pouch is opened and placed in the chamber, the liquid materials may drip out of the pouch before pressure is applied to the flexible pouch. This may cause a mess in and around the chamber and prevent the entirety of the liquid materials from being mixed with water in the bottle. Further, a variety of flexible pouches may be used to contain the liquid materials, but a challenge arises in creating a flexible pouch that can be efficiently filled with the liquid ingredients and is space efficient. Complex valves may be made from different materials than the flexible pouch and be sealed or welded into the flexible pouch to prevent the liquid materials from evacuating from the flexible pouch. However, these valves create complexities for filling the flexible pouches efficiently, cause challenges related to recycling, and add additional costs to the manufacturing process.

Therefore, to address these deficiencies, solutions should provide a seal bar that can seal the nozzle area of a flexible pouch in a custom shape designed to prevent the liquid materials from evacuating from the flexible pouch before pressure is applied and control the fluid flow path when pressure is applied to the flexible pouch. Such solutions should result in a flexible pouch that can be filled through a wide opening in the top to allow for a quicker and more cost-efficient filling and sealing process. Such solutions should provide for a flexible pouch that allows for easy evacuation of the liquid materials when pressure is applied to the flexible pouch. Such flexible pouches should also be made to take up less space to lower the costs of packaging, shipping, and storage.

The disclosed systems, methods, and apparatuses address the problems set forth above as well as other deficiencies in the existing systems, methods, and apparatuses.

SUMMARY

The disclosed embodiments disclose a seal bar for sealing a pouch. The seal bar may comprise a face, wherein the face may be configured to apply heat to seal the pouch, a cavity, wherein the cavity may be configured to form a nozzle shape in the pouch, a seal dot, wherein the seal dot may be configured to apply heat to the pouch, and a heating element, wherein the heating element may be configured to heat the face.

According to a disclosed embodiment, the cavity may comprise a recessed area in the face.

According to a disclosed embodiment, the seal dot may be located within the cavity.

According to a disclosed embodiment, the seal dot may comprise a raised area within the cavity.

According to a disclosed embodiment, the seal dot may be configured to seal a central portion of the nozzle shape in the pouch.

According to a disclosed embodiment, the seal bar may further comprise a plug opening.

According to a disclosed embodiment, the plug opening may comprise an opening within the cavity.

According to a disclosed embodiment, the seal bar may further comprise a plug, wherein the seal dot is located on the plug.

According to a disclosed embodiment, the plug may be configured to be interchangeably placed within the plug opening within the cavity.

According to a disclosed embodiment, the seal dot may be square in shape.

According to a disclosed embodiment, the seal dot may be triangular in shape.

According to a disclosed embodiment, the seal dot may be oval in shape.

According to a disclosed embodiment, the seal dot may be circular in shape.

According to a disclosed embodiment, the seal dot may be linear in shape.

According to a disclosed embodiment, the seal bar may comprise at least two seal dots.

According to a disclosed embodiment, the heating element may comprise a heating rod.

According to a disclosed embodiment, the seal bar may comprise an opening configured to contain the heating rod.

According to a disclosed embodiment, the heating rod may be configured to transfer heat to the face of the seal bar through the opening.

According to a disclosed embodiment, a distance between the heating rod and the seal dot may be adjustable.

According to a disclosed embodiment, the heating element may distribute heat evenly across the face of the seal bar.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1A:
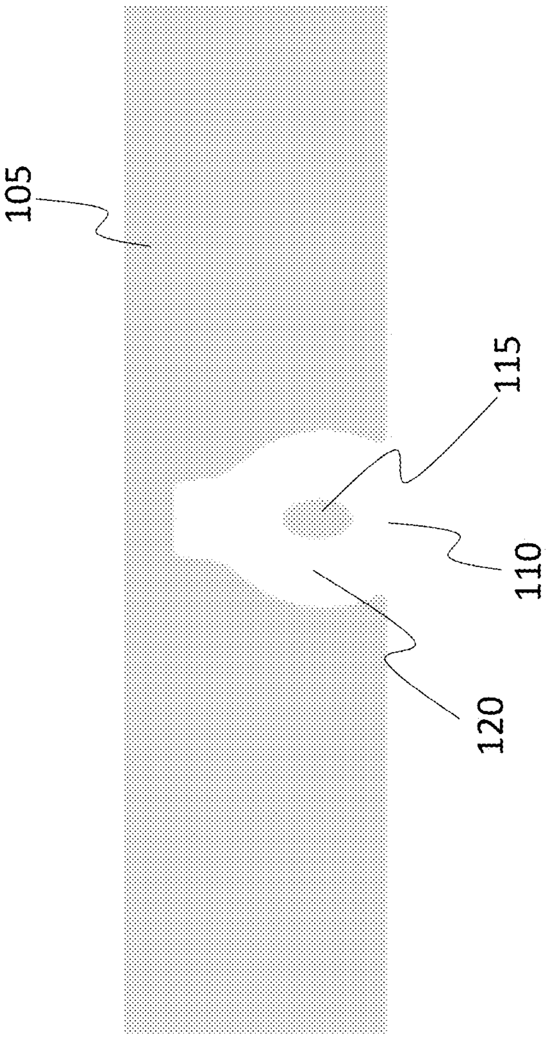
FIG. 1A depicts a seal bar, in accordance with disclosed embodiments.
Figure 1B:
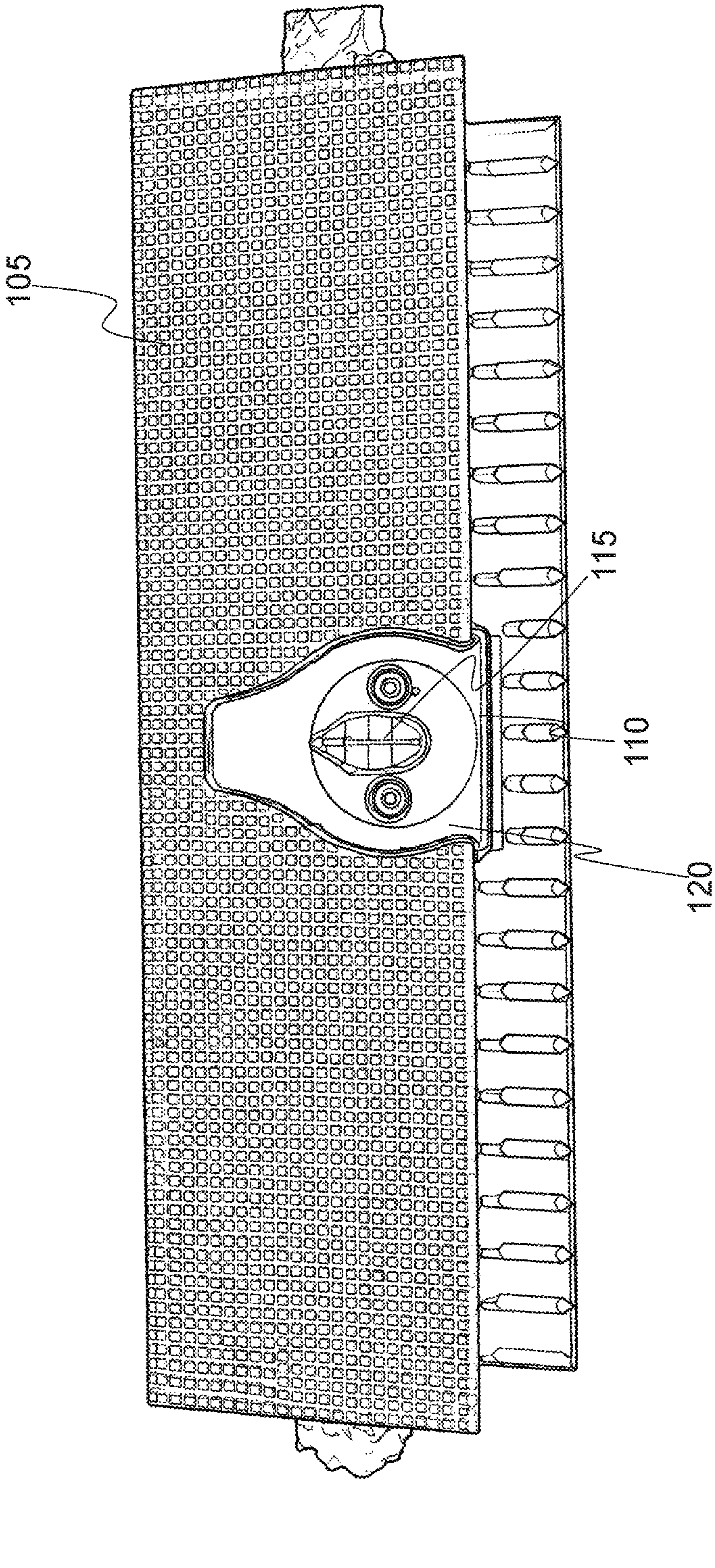
FIG. 1B depicts a seal bar, in accordance with disclosed embodiments.
Figure 2B:
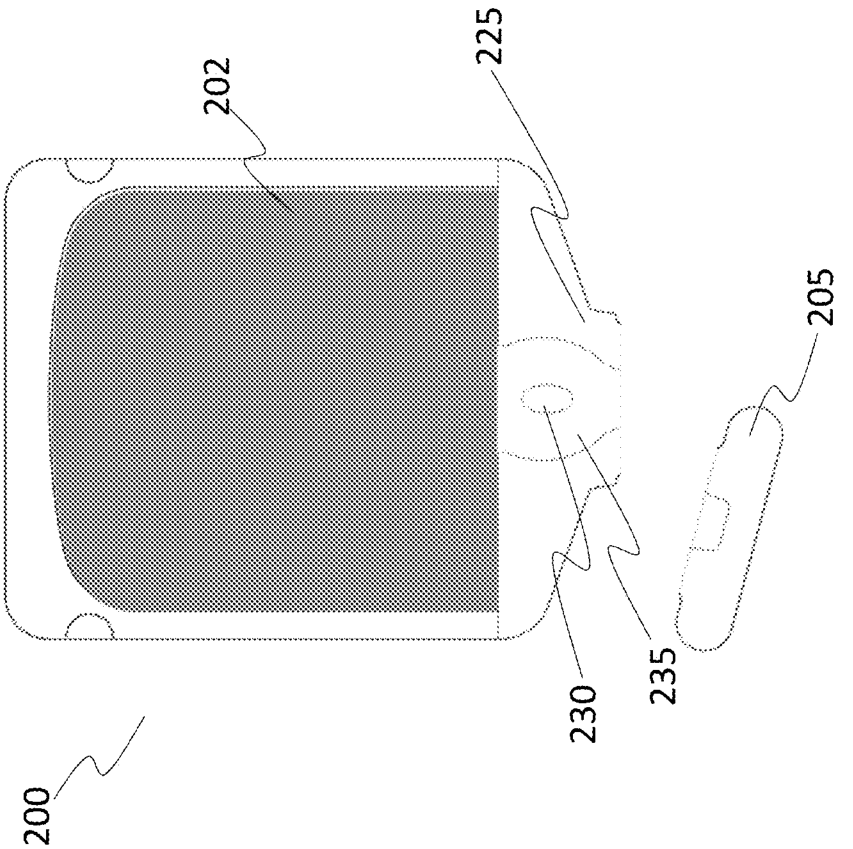
FIG. 2B depicts a flexible pouch with a removed tear strip, in accordance with disclosed embodiments.
Figure 2A:
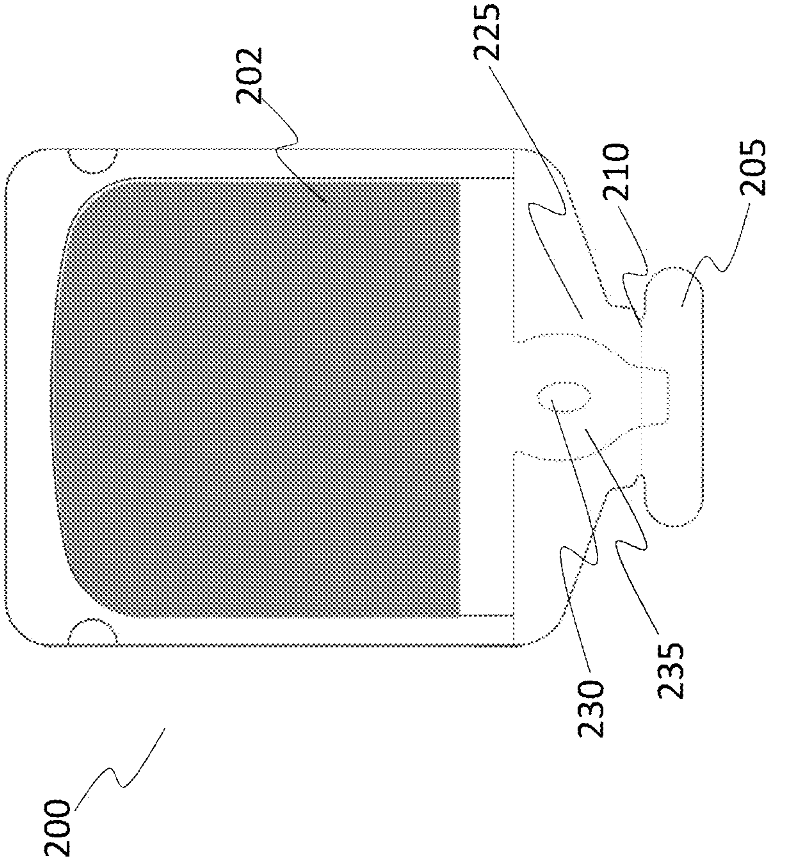
FIG. 2A depicts a flexible pouch with a tear strip, in accordance with disclosed embodiments.
Figure 2C:
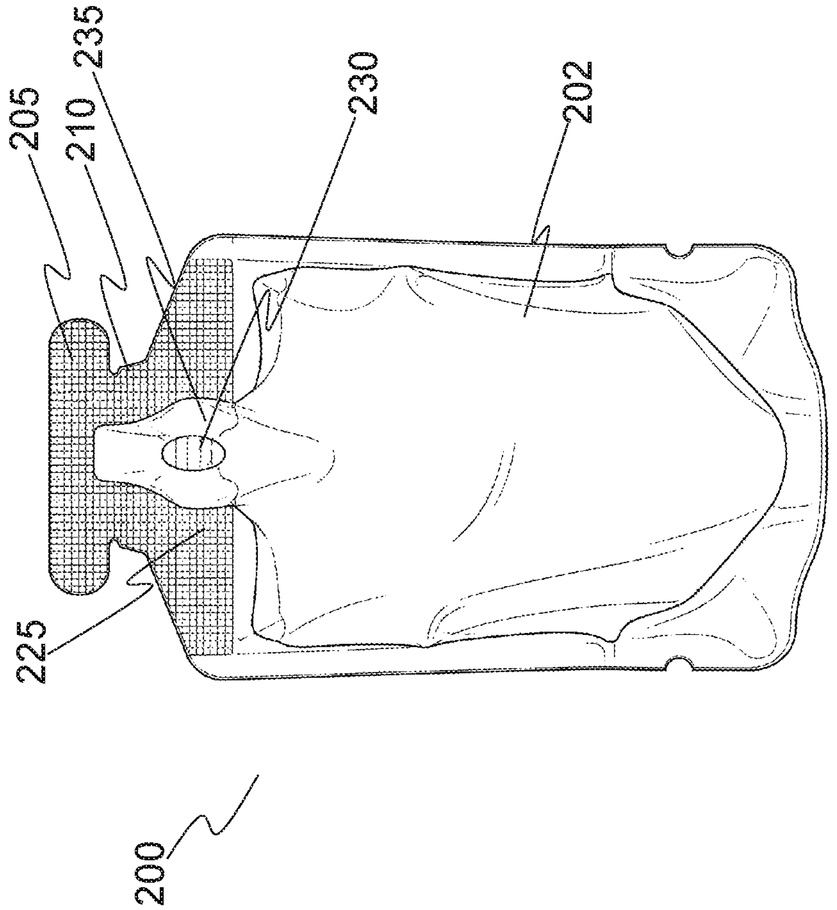
FIG. 2C depicts a flexible pouch, in accordance with disclosed embodiments.

FIG. 1A and FIG. 1B depict an exemplary seal bar 105, in accordance with disclosed embodiments. Seal bar 105 may be configured to apply heat to a flexible pouch, such as flexible pouch 200 as depicted in FIGS. 2A-2C, to seal the top opening of a filled flexible pouch 200. By applying heat to flexible pouch 200, seal bar 105 may create an airtight seal at the opening of a filled flexible pouch 200 to protect and contain the liquid materials inside flexible pouch 200. Seal bar 105 may also create a custom seal area of flexible pouch 200 to generate a seal in flexible pouch 200 that may act as a non-moving flow control valve to prevent liquid materials sealed within flexible pouch 200 from evacuating from an opened flexible pouch 200 before pressure is applied to flexible pouch 200. The geometry of seal bar 105 may correspond to a viscosity of the liquid material being sealed within flexible pouch 200. For example, differing viscosities and volumes of liquid materials being sealed within flexible pouch 200 may require a differing seal bar 105 geometry to prevent the liquid material from evacuating or dripping from an opened flexible pouch 200 before pressure is applied to flexible pouch 200.

Seal bar 105 may comprise a cavity 110. Cavity 110 may comprise a recessed area in the face of seal bar 105 in which heat is not applied to flexible pouch 200. Because heat is not applied to flexible pouch 200 in the area of cavity 110, seal bar 105 may create a custom shape corresponding to the shape of cavity 110 in nozzle 225 of flexible pouch 200 (as depicted in FIGS. 2A-2C). Cavity 110 in seal bar 105 may include a central seal dot 115. Seal dot 115 may comprise a raised area within cavity 110 that may facilitate sealing of a central portion of nozzle 225 of flexible pouch 200 (as depicted in FIGS. 2A-2C). Seal dot 115 may apply heat to flexible pouch 200 to seal a central portion of nozzle 225 of flexible pouch 200. Cavity 110 and seal dot 115 may create a flow path cavity 120. Flow path cavity 120 may comprise a recessed area in the face of seal bar 105. The size and shape of flow path cavity 120 may be wider or narrower based on the size and shape of cavity 110 and seal dot 115. The size, shape, and configuration of cavity 110, seal dot 115, and flow path cavity 120 may vary based on the viscosity and volume of liquid materials being sealed within flexible pouch 200. The size, shape, and configuration of cavity 110, seal dot 115, and flow path cavity 120 may form a seal in flexible pouch 200 that may act as a non-moving flow control valve to prevent liquid materials sealed within flexible pouch 200 from evacuating from an opened flexible pouch 200 before pressure is applied to flexible pouch 200.

FIGS. 2A-2C depict flexible pouch 200 filled with liquid material 202 sealed by a seal bar, such as seal bar 105. Liquid material 202 may comprise any viscous material, such as for example, plant-based paste, lotion, cream, shampoo, hair product, sauce, ketchup, food puree, juice, smoothie, or any other liquid materials. Flexible pouch may comprise nozzle 225, tear strip 205, and seal cavity 235. Nozzle 225 may comprise the sealed top of flexible pouch 200 and may include an opening in flexible pouch 200 through which liquid material 202 may flow when flexible pouch 200 is open. Nozzle 225 may act as a non-moving flow control valve to prevent the flow of liquid out of flexible pouch 200 before pressure is applied to flexible pouch 200 and may direct the flow of liquid material 202 as it is evacuated from flexible pouch 200.

Nozzle 225 may comprise seal dot 230 and seal cavity 235. Seal dot 230 and seal cavity 235 may correspond to seal dot 115 and cavity 110 of seal bar 105. Seal cavity 235 may comprise a portion of nozzle 225 that is unsealed to allow the flow of liquid materials 202 from flexible pouch 200 when pressure is applied to flexible pouch 200. Seal dot 230 may comprise a sealed area within seal cavity 235. The size, shape, and location of seal dot 230 within seal cavity 235 may prevent liquid materials 202 from evacuating or dripping from flexible pouch 200 unless pressure is applied to flexible pouch 200. For example, a wider seal cavity 235 may be provided for a liquid material 202 with a higher viscosity and a narrower seal cavity 235 may be provided for a liquid material 202 with a lower viscosity. The size and shape of seal cavity 235 may create flow restriction based on the viscosity of liquid material 202 sealed within flexible pouch 200 without the use of any additional sealing material or valves within flexible pouch 200.

As depicted in FIGS. 2A-2C, flexible pouch 200 may further comprise tear strip 205 and tear line 210. Tear strip 205 may be removed by an end user to open nozzle 225 of flexible pouch 200 prior to evacuating liquid materials 202 from flexible pouch 200. Tear line 210 may facilitate the removal of tear strip 205 from flexible pouch 200. An end user may remove tear strip 205 by tearing along tear line 210 prior to applying pressure to flexible pouch 200 to evacuate liquid materials 202 through nozzle 225. After tear strip 205 is removed from flexible pouch 200, the size and shape of seal dot 230 within seal cavity 235 may prevent liquid material 202 from evacuating from flexible pouch 200 until pressure is applied to flexible pouch 200.

Figures 3A, 3B, 3C, 3D:
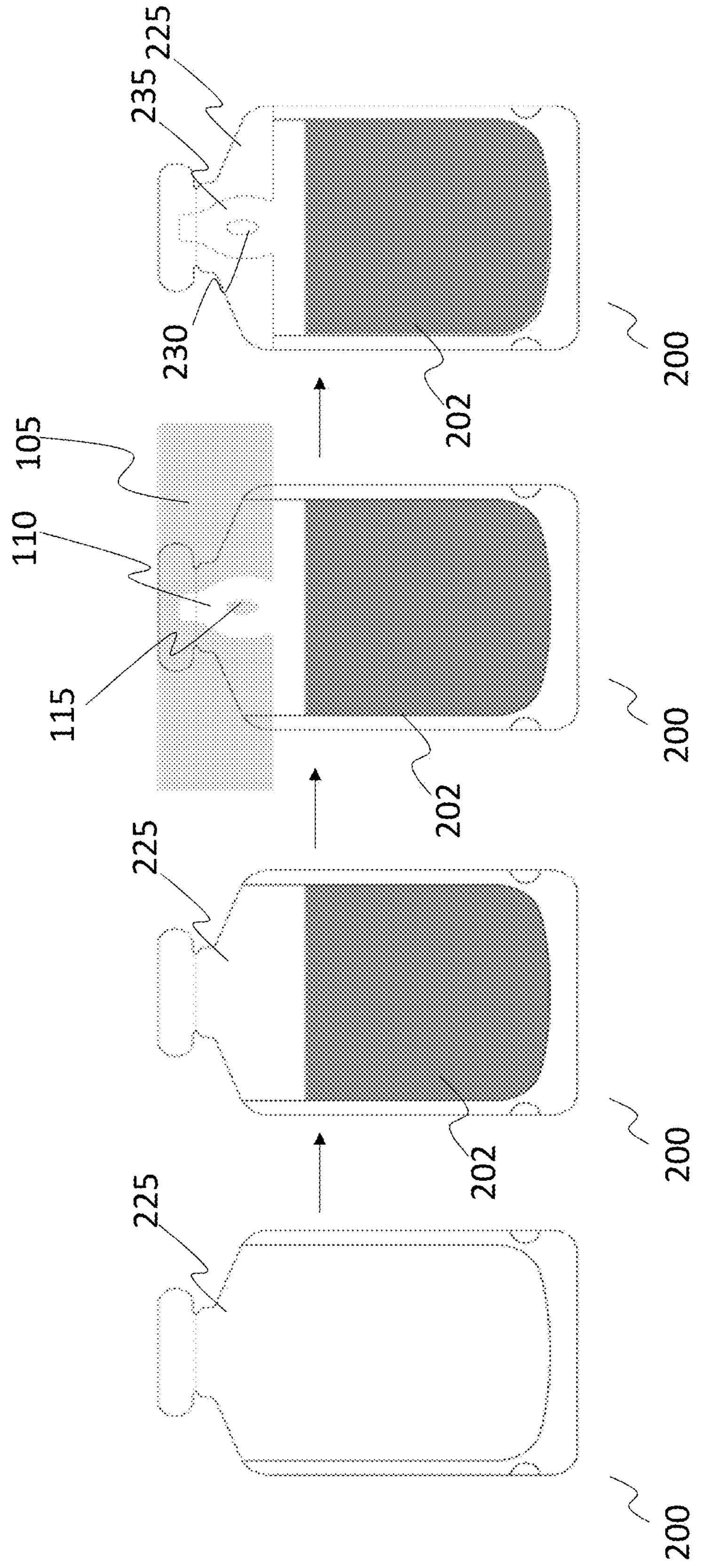
FIGS. 3A-3D depict a method of sealing a flexible pouch with a seal bar, in accordance with disclosed embodiments.

FIGS. 3A-3D depict a method of filling and sealing flexible pouch 200 using seal bar 105. In FIG. 3A, a pre-made flexible pouch 200 may be completely open at the top. The side and bottom edges of flexible pouch 200 may be pre-sealed prior to filling flexible pouch 200. In FIG. 3B, flexible pouch 200 may be filled with liquid material 202. Liquid material 202 may be filled into flexible pouch 200 through the opening at the top of flexible pouch 200. The large opening across the top of flexible pouch 200 may allow for faster and more efficient filling of flexible pouch 200. As shown in FIG. 3C, once flexible pouch 200 is filled with liquid material 202, seal bar 105 may be applied to nozzle 225 of flexible pouch 200. Seal bar 105 may include seal dot 115 and cavity 110. Seal bar 105 may seal nozzle 225 of flexible pouch 200 by applying heat to flexible pouch 200 to melt the material of flexible pouch 200 together. The area within cavity 110 may not apply heat to flexible pouch 200 and thus may not seal the corresponding seal cavity 235 of flexible pouch 200. As depicted in FIG. 3D, after seal bar 105 is applied to seal flexible pouch 200, nozzle 225 may include seal dot 230 and seal cavity 235. Seal dot 230 and seal cavity 235 may act as a non-moving flow control valve that may control the fluid flow of the liquid materials 202 from flexible pouch 200. This may prevent liquid materials 202 from evacuating or dripping from flexible pouch 200 until pressure is applied to flexible pouch 200. The geometry of seal dot 230 and seal cavity 235, and the resulting flow restriction created by seal dot 230 and seal cavity 235, may be based on the viscosity and volume of liquid material 202 within flexible pouch 200.

Figure 4B:
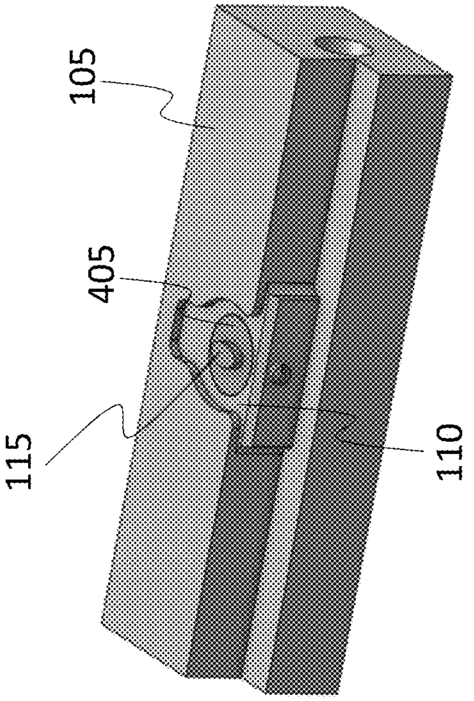
FIGS. 4A-4B depict a seal bar with a plug and plug opening, in accordance with disclosed embodiments.
Figure 4A:
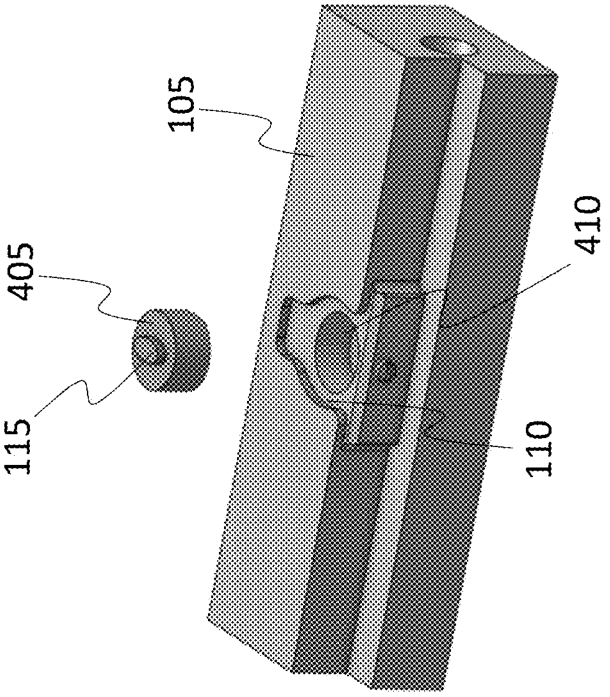

As depicted in FIG. 4A and FIG. 4B, seal bar 105 may comprise plug 405 and plug opening 410. Plug opening 410 may include an opening within cavity 110 which may accept plug 405. As depicted in FIG. 4A, plug opening 410 may be circular in shape. In other embodiments, plug opening 410 may be square, rectangular, elliptical, polygonal, or any other suitable shape. The size and shape of plug opening 410 may correspond to the size and shape of plug 405, such that plug 405 may be placed within plug opening 410.

Plug 405 may comprise a removeable and interchangeable section of seal bar 105 located within cavity 110. Seal dot 115 may be incorporated into plug 405. For example, seal dot 115 may comprise a raised surface extending upwardly from the face of plug 405. Plug 405 including seal dot 115 may be placed in plug opening 410 to provide a specified size and shape of cavity 110. Accordingly, the size and shape of plug 405 may correspond to the size and shape of plug opening 410 such that plug 405 may be placed within plug opening 410 of seal bar 105. As depicted in FIG. 4A, plug 405 may be circular in shape. In other embodiments, plug 405 may be square, rectangular, elliptical, polygonal, or any other suitable shape. Plug 405 may comprise a variety of seal dot 115 sizes, shapes, and configurations to be used in seal bar 105. A variety of liquid materials may be sealed within flexible pouch 200 (as depicted in FIGS. 2A-2C) by seal bar 105 and the interchangeable plug 405 may allow for varying configurations of sealing shapes and sizes based on the specific geometry of seal dot 115 on plug 405. The replaceable plug 405 may allow for custom sealing shapes to be created by seal bar 105 based on the varying viscosities of liquid materials being sealed by seal bar 105 within flexible pouch 200 and based on differing applications of seal bar 105. For example, a plug 405 with a desired seal dot 115 geometry may be selected based on the viscosity and volume of liquid materials to be sealed within flexible pouch 200 and placed interchangeably within plug opening 410 of seal bar 105 to create a custom seal shape on the sealed flexible pouch 200.

Figure 5C:
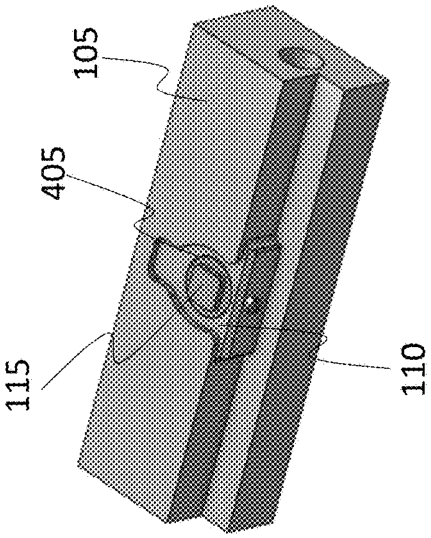
FIG. 5C depicts a seal bar with a square seal dot, in accordance with disclosed embodiments.
Figure 5B:
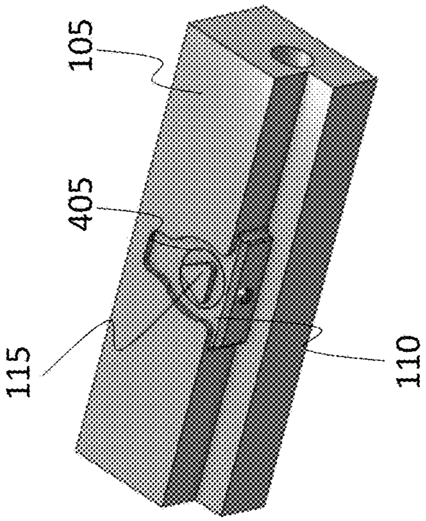
FIG. 5B depicts a seal bar with a triangular seal dot, in accordance with disclosed embodiments.
Figure 5A:
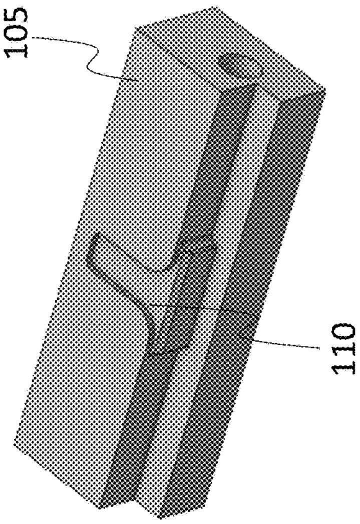
FIG. 5A depicts a seal bar without a seal dot, in accordance with disclosed embodiments.
Figure 5E:
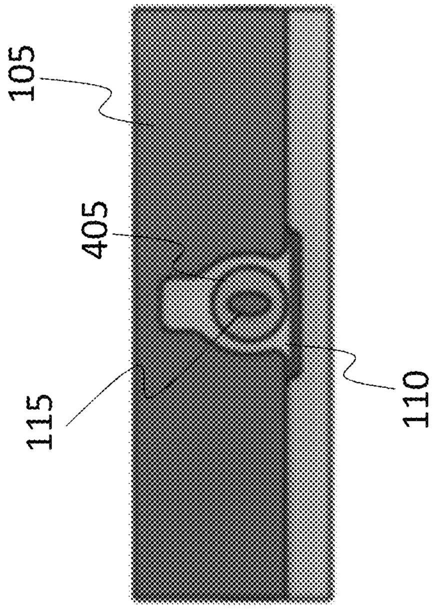
FIG. 5E depicts a seal bar with an oval seal dot, in accordance with disclosed embodiments.
Figure 5D:
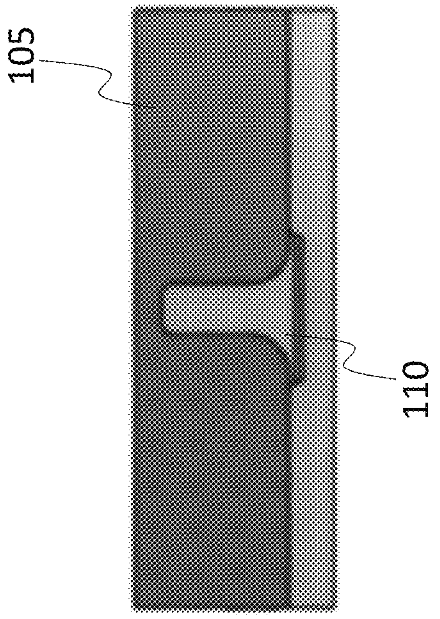
FIG. 5D depicts a seal bar without a seal dot, in accordance with disclosed embodiments.

FIGS. 5A-5J depict exemplary sizes and shapes of cavity 110 and seal dots 115 for use in seal bar 105. As depicted in FIG. 5A and FIG. 5D, seal bar 105 may comprise cavity 110 without seal dot 115. As depicted in FIG. 5A and FIG. 5D, cavity 110 may comprise a substantially rectangular shape. In other embodiments, cavity 110 may be triangular, square, circular, elliptical, polygonal, or any other shape. As depicted in FIG. 5A and FIG. 5D, the size and shape of cavity 110 may sufficiently restrict the flow of the liquid materials sealed in a flexible pouch, such as flexible pouch 200, without the use of a seal dot or other flow restrictors. For example, seal bar 105 without seal dot 115 may be used when the liquid material contained within the sealed flexible pouch is viscous enough to stop the flow of liquid against gravity within the narrow channel created by seal bar 105.

Figure 5F:
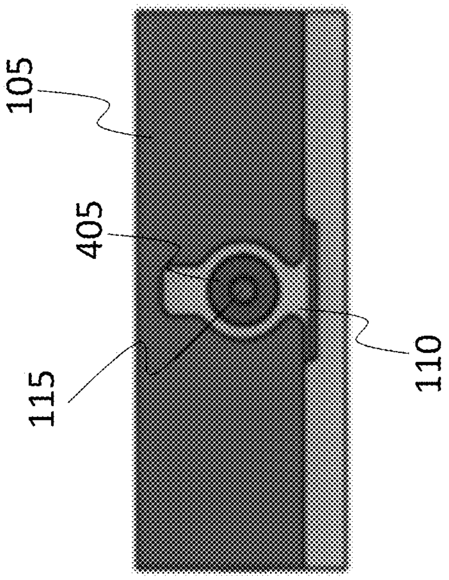
FIG. 5F depicts a seal bar with a circular seal dot, in accordance with disclosed embodiments.

As depicted in FIG. 5B, seal dot 115 may comprise a triangular shape. As depicted in FIG. 5C, seal dot 115 may comprise a square shape. As depicted in FIG. 5E, seal dot 115 may comprise an oval shape. As depicted in FIG. 5F, seal dot 115 may comprise a circular shape. In other embodiments, seal dot 115 may be rectangular, elliptical, polygonal, or any other shape. The size, shape, and configuration of cavity 110 and seal dot 115 may create varying flow restrictions in a flexible pouch based on the viscosity of the liquid materials being sealed in flexible pouch. In some embodiments, as depicted in FIG. 5A and FIG. 5D, seal dot 115 may not be required to prevent liquid materials from evacuating from an opened flexible pouch 200 based on a higher viscosity of the liquid materials in flexible pouch 200. In other embodiments, seal dot 115 may be used to create flow restrictions to prevent liquid materials from evacuating from an opened flexible pouch based on a lower viscosity of the liquid materials in flexible pouch. As depicted in FIGS. 5B, 5C, 5E, and 5F, the use of interchangeable plug 405 with a variety of seal dot 115 shapes on each plug 405 may allow for a variety of geometries to be used within one seal bar 105. For example, a plurality of plugs 405 may include a variety of seal dot 115 shapes that may be interchangeably placed within seal bar 105 to provide custom seal shapes.

Figure 5G:
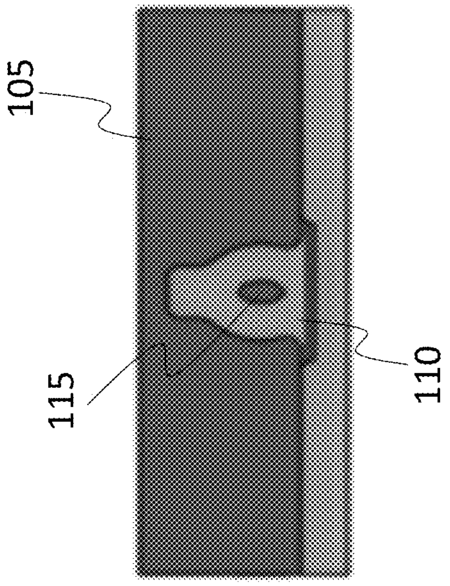
FIG. 5G depicts a seal bar with an oval seal dot, in accordance with disclosed embodiments.
Figure 5J:
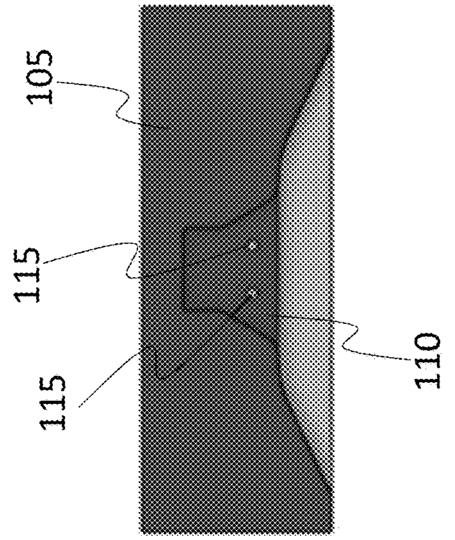
FIG. 5J depicts a seal bar with two circular seal dots, in accordance with disclosed embodiments.
Figure 5I:
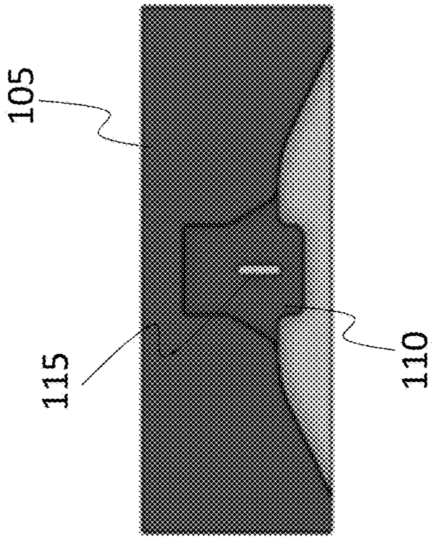
FIG. 5I depicts a seal bar with a linear seal dot, in accordance with disclosed embodiments.
Figure 5H:
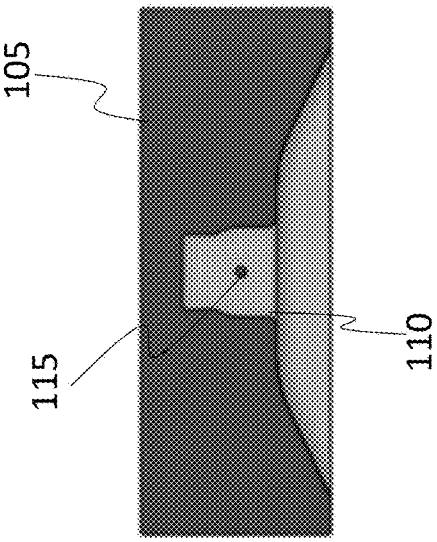
FIG. 5H depicts a seal bar with a circular seal dot, in accordance with disclosed embodiments.

FIGS. 5G-5J depict alternative embodiments of seal dot 115. As depicted in FIG. 5G, seal dot 115 may be oval in shape. As depicted in FIG. 5H, seal dot 115 may be circular in shape. The size of a circular seal dot 115 may vary depending on the type of liquid material sealed within a flexible pouch. As depicted in FIG. 5I, seal dot 115 may be linear in shape. In some embodiments, seal dot 115 may be wider or narrower than seal dot 115 as depicted in FIG. 5I to control the flow rate of liquid out of the sealed pouch. For each example, a wider linear seal dot 115 may be used to seal a less viscous material within a flexible pouch and a narrower linear seal dot 115 may be used to seal a more viscous material within a flexible pouch. As depicted in FIG. 5J, seal bar 105 may comprise two seal dots 115. Although FIG. 5J depicts seal bar 105 with two seal dots 115, seal bar 105 may comprise more or fewer seal dots 115. As depicted in FIGS. 5G-5J, seal dot 115 may be incorporated directly within cavity 110 of seal bar 105. In such embodiments, seal dot 115 may not be interchangeably removed from seal bar 105. Although FIGS. 5G-5I depict one seal dot 115 on seal bar 105, seal bar 105 may comprise more or fewer seal dots 115.

Figures 6A, 6B:
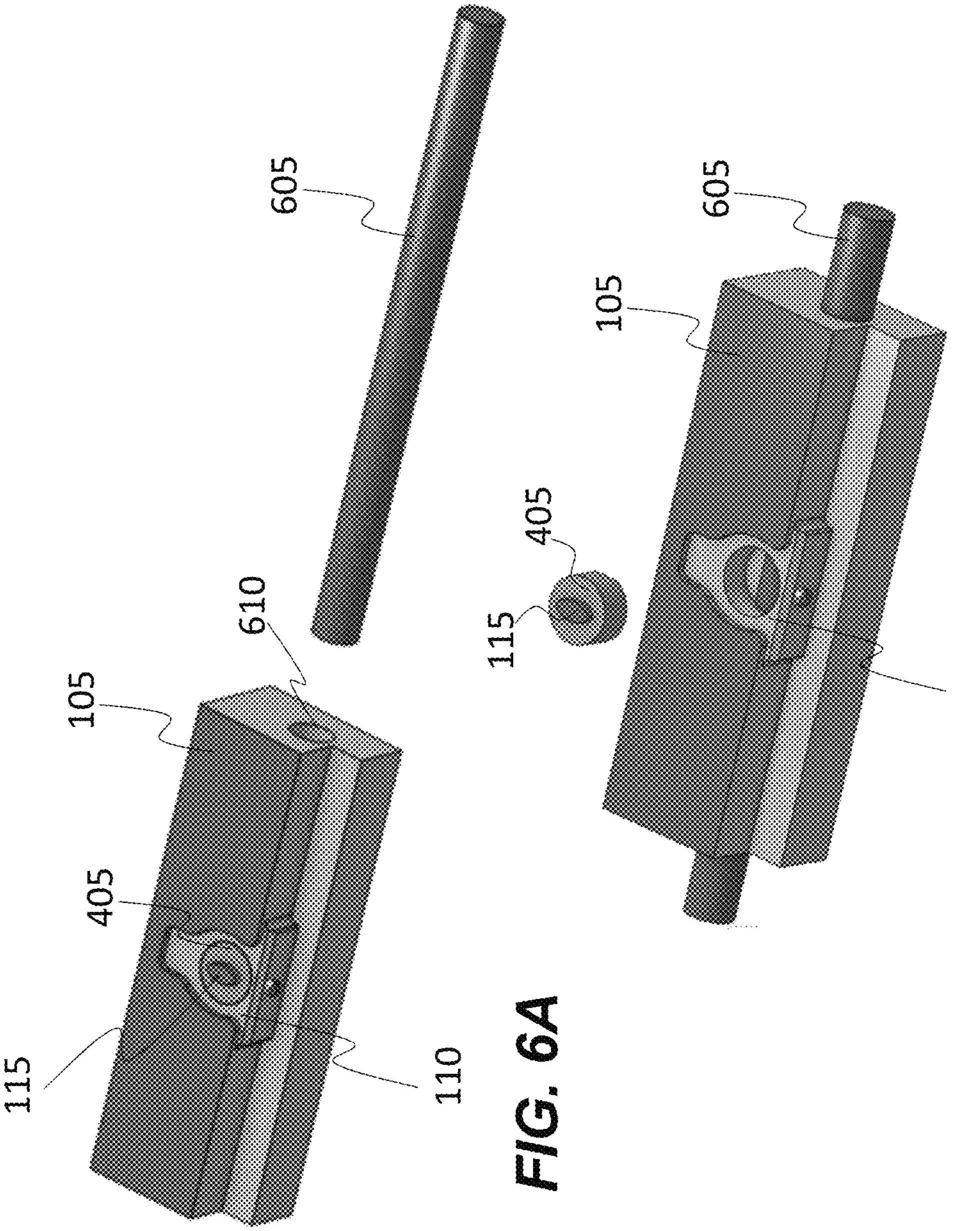
FIG. 6A depicts a seal bar with a heating rod removed from the body of the seal bar, in accordance with disclosed embodiments.
FIG. 6B depict a seal bar with a heating rod extending through the seal bar, in accordance with disclosed embodiments.

FIG. 6A and FIG. 6B depict an exemplary heating rod 605 for use in seal bar 105. As disclosed herein, a flexible pouch, such as flexible pouch 200, may be sealed using seal bar 105 by applying heat through seal bar 105 to flexible pouch 200. Heating rod 605 may comprise the heating element of seal bar 105. Heating rod 605 may be inserted into seal bar 105 through opening 610. When flexible pouch 200 is to be sealed, heating rod 605 may be heated to the appropriate sealing temperature. Heating rod 605 may be in contact with seal bar 105 through opening 610 to distribute the heat from heating rod 605 evenly across the face of seal bar 105. The distance between heating rod 605 and seal dot 115 may be adjusted to provide appropriate heat transfer from heating rod 605 to the face of seal dot 115. After heating rod 605 transfers heat to the face of seal bar 105, seal bar 105 may be applied to flexible pouch 200 to seal the opening of flexible pouch 200 by melting the pouch material together. In other embodiments, seal bar 105 may seal flexible pouch 200 by transferring ultrasonic vibrations from an ultrasonic horn (not shown) that may seal the pouch material together by high frequency friction. In some embodiments, both a heat seal bar and an ultrasonic seal bar may be used in sequence to create the sealed area of flexible pouch 200. Because cavity 110 comprises a recessed void in the surface of seal bar 105, heat from heating rod 605 may not be transferred to flexible pouches 200 in this area, thus creating the desired custom shape in the nozzle of flexible pouch 200.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations, and/or alterations based on the present disclosure. Further, the steps of the disclosed methods can be modified in any manner, including reordering steps and/or inserting or deleting steps.

The features and advantages of the disclosure are apparent from the detailed specification. As used herein, the indefinite articles “a” and “an” mean “one or more.” Similarly, the use of a plural term does not necessarily denote a plurality unless it is unambiguous in the given context. Words such as “and” or “or” mean “and/or” unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. As used herein, unless otherwise noted, the term “set” means one or more (i.e., at least one), and the phrase “any solution” means any now known or later developed solution. Other embodiments will be apparent from a consideration of the specification and practice of the embodiments disclosed herein.

What is claimed is:

1. A seal bar for sealing a pouch, the seal bar comprising:
- a face, the face configured to apply heat to seal the pouch;
- a cavity, the cavity configured to form a nozzle shape in the pouch;
- a seal dot, the seal dot configured to apply heat to the pouch; and
- a heating element, the heating element configured to heat the face.

2. The seal bar of claim 1, wherein the cavity comprises a recessed area in the face.

3. The seal bar of claim 1, wherein the seal dot is located within the cavity.

4. The seal bar of claim 3, wherein the seal dot comprises a raised area within the cavity.

5. The seal bar of claim 1, wherein the seal dot is configured to seal a central portion of the nozzle shape in the pouch.

6. The seal bar of claim 1, wherein the seal bar further comprises a plug opening.

7. The seal bar of claim 6, wherein the plug opening comprises an opening within the cavity.

8. The seal bar of claim 6, wherein the seal bar further comprises a plug, wherein the seal dot is located on the plug.

9. The seal bar of claim 8, wherein the plug is configured to be interchangeably placed within the plug opening within the cavity.

10. The seal bar of claim 1, wherein the seal dot is square in shape.

11. The seal bar of claim 1, wherein the seal dot is triangular in shape.

12. The seal bar of claim 1, wherein the seal dot is oval in shape.

13. The seal bar of claim 1, wherein the seal dot is circular in shape.

14. The seal bar of claim 1, wherein the seal dot is linear in shape.

15. The seal bar of claim 1, wherein the seal bar comprises at least two seal dots.

16. The seal bar of claim 1, wherein the heating element comprises a heating rod.

17. The seal bar of claim 16, wherein the seal bar comprises an opening configured to contain the heating rod.

18. The seal bar of claim 17, wherein the heating rod is configured to transfer heat to the face of the seal bar through the opening.

19. The seal bar of claim 16, wherein a distance between the heating rod and the seal dot is adjustable.

20. The seal bar of claim 1, wherein the heating element distributes heat evenly across the face of the seal bar.

* * * * *